United States Patent [19]
Holzhauser et al.

[11] 3,860,195
[45] Jan. 14, 1975

[54] DISABLING DEVICE FOR AN ANTI-BACKUP MECHANISM IN A FILM CARTRIDGE

[75] Inventors: Ronald Charles Holzhauser, Holley; Gerald Julius Kosarko, Pavilion, both of N.Y.

[73] Assignee: Eastman Kodak Company, Rochester, N.Y.

[22] Filed: May 4, 1972

[21] Appl. No.: 250,352

[52] U.S. Cl. .................................. 242/194, 352/72
[51] Int. Cl.... G03b 1/04, G11b 15/32, G11b 23/04
[58] Field of Search .......................... 242/194–200, 242/71.1, 71.2; 352/72–78

[56] References Cited
UNITED STATES PATENTS

| | | |
|---|---|---|
| 3,227,387 | 1/1966 | Laa et al. ........................... 242/198 |
| 3,584,806 | 6/1971 | Edwards et al. .................... 242/198 |
| 3,599,894 | 8/1971 | Edwards ............................ 242/194 |
| 3,692,256 | 9/1972 | Kember ............................. 242/198 |

*Primary Examiner*—Leonard D. Christian
*Attorney, Agent, or Firm*—John Morrow

[57] ABSTRACT

A motion picture camera is equipped with a device for disabling an anti-backup mechanism in a film cartridge when the cartridge is inserted into the camera. The disabling device includes a spring biased cylindrical pin which is positioned to depress the anti-backup mechanism into an inoperative position upon insertion of the cartridge into the camera. If a film cartridge without a disengageable anti-backup is inserted into the camera, the pin retracts against the spring biases so that the disabling device has no effect.

5 Claims, 5 Drawing Figures

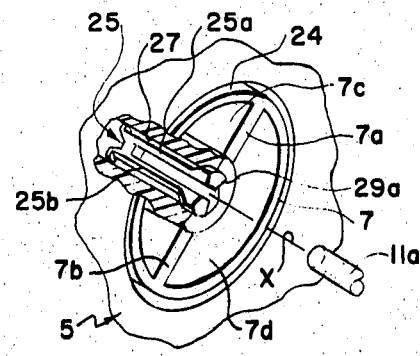
FIG.4
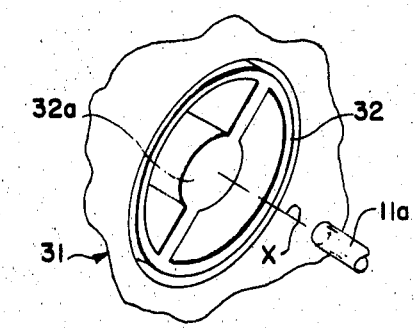
FIG.5
FIG.3
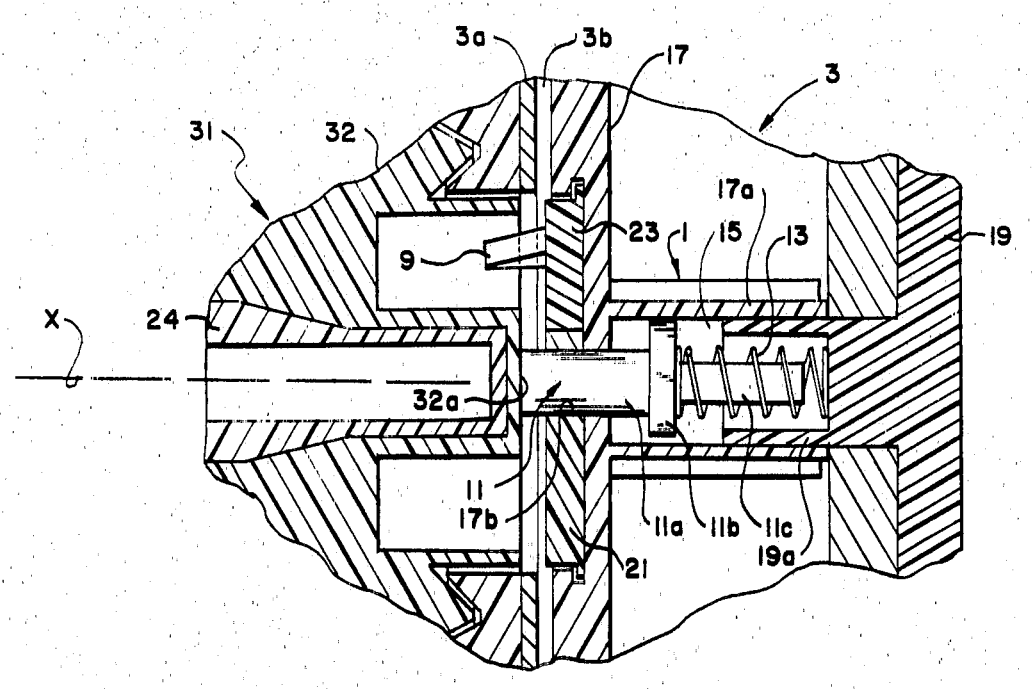

DISABLING DEVICE FOR AN ANTI-BACKUP MECHANISM IN A FILM CARTRIDGE

BACKGROUND OF THE INVENTION

1. Field of the Invention

This invention relates to a device for disabling an anti-backup mechanism in a film cartridge employing a disengageable anti-backup mechanism when such a cartridge is placed within a camera, and to such a device which does not impair operation in a camera of a cartridge not equipped with such a disengageable anti-backup device.

2. Description of the Prior Art

Certain types of commercial film cartridges (referred to as "super 8" cartridges) include a substantially rectangular housing in which a supply roll of film and a takeup core are rotatably mounted in a side-by-side, coaxial relationship. See, for example, commonly assigned U.S. Pat. Nos. 3,208,685 and 3,208,686 in the name of Edwards et al. In these type of cartridges there is a tendency for the film to "clockspring," "clockspringing" being a partial loosening and radial displacement of successive outer convolutions of the film roll resulting from the reverse rotation of the core when the cartridge is subjected to sharp movements. This tendency to "clockspring" can be prevented by the use of an anti-backup mechanism of the type disclosed in commonly assigned U.S. Pat. Nos. 3,584,806, and 3,599,894 and in pending U.S. Pat. Application Ser. No. 299,924 entitled "Disengageable Anti-Backup Device for Film Cartridges" filed Feb. 28, 1972 in the name of A. J. Tucker.

Such anti-backup mechanisms operate to prevent the reverse rotation of a film take-up core and hence prevent clockspringing. However, there are various problems associated with the use of an anti-backup mechanism which makes it desirable that the mechanism be disengaged when the cartridge is inserted in a camera. The problems are: (1) there is a "clicking" noise made by the anti-backup mechanism during operation and this noise is picked up by the sound apparatus that may be associated with the camera; and (2) the film must be driven in the reverse direction (a) to permit "fade, lap and dissolve" type filming sequences or (b) to permit the removal of the exposed film through the exposure aperture of the cartridge for film processing. For a more detailed disclosure of "fade, lap and dissolve" type operation reference is made to U.S. Pat. 3,584,806 mentioned earlier.

To disengage the anti-backup mechanisms, the camera can be equipped with an anti-backup disabling device of the type shown in U.S. Pat. Nos. 3,584,806 and 3,599,894. Such a device comprises a pin positioned to disable the anti-backup mechanism when the film cartridge is placed in the camera by an operator depressing it into a disabled position when "fade, lap and dissolve" filming is desired. If a disabling device of this type is rigidly fixed in position, it renders the camera unsuitable for receiving commercially available super 8 film cartridges with anti-backup mechanisms that are not disengageable since such cartridges have a rigid core center and therefore cannot accommodate a rigid disabling pin in a camera.

SUMMARY OF THE INVENTION

An object of the invention is to provide a device capable of automatically disengaging a disengageable anti-backup mechanism in a film cartridge when such a camera is placed in a camera, and to such a device which does not interfere with insertions into the camera of a cartridge without a disengageable anti-backup device.

In accordance with the invention, a motion picture camera has a device for disabling an anti-backup mechanism in a film cartridge when the cartridge is inserted into a camera. The disabling device comprises a pin that is urged to a first position to depress the anti-backup mechanism into a disengaged position, and the pin being retractable to a second position responsive to the insertion into the camera of another cartridge without a disengageable anti-backup device. Means are provided for urging the pin against the anti-backup mechanism and for returning said pin to its first position from its second position when a cartridge is removed from the camera.

In accordance with a preferred embodiment, a motion picture camera which is adapted to receive a cartridge having a disengageable anti-backup mechanism includes a device for disabling the mechanism when the cartridge is inserted into the camera. The disabling device includes an elongate disengaging member which is movable between (1) a first position wherein the member disengages the mechanism in the cartridge and (2) a second position wherein the member is in a retracted position. The disengaging member is urged from the second position toward the first position by a spring which is engageable with the member.

The invention, and its objects and advantages, will become apparent from the detail description of the preferred embodiments presented below.

BRIEF DESCRIPTION OF THE DRAWINGS

In a detailed description of the preferred embodiment of the invention presented below, reference is made to the accompanying drawings, in which:

FIG. 3 is a fragmentary cross-section view similar to FIG. 2 but showing the disabling device in a retracted position it assumes when a second type of film cartridge is loaded into the camera;

FIG. 4 is a partial perspective view showing the relationship of the disabling pin with respect to the anti-backup mechanism of the cartridge shown in FIGS. 1 and 2; and FIG. 5 is a view similar to FIG. 4 but showing the pin with respect to the type of cartridge shown in FIG. 3.

DESCRIPTION OF THE PREFERRED EMBODIMENT

Because photographic apparatus is well known, the present description will be directed in particular to elements forming part of, or cooperating more directly with, the present invention, elements not specifically shown or described herein being understood to be selectable from those known in the art.

Figure 1:
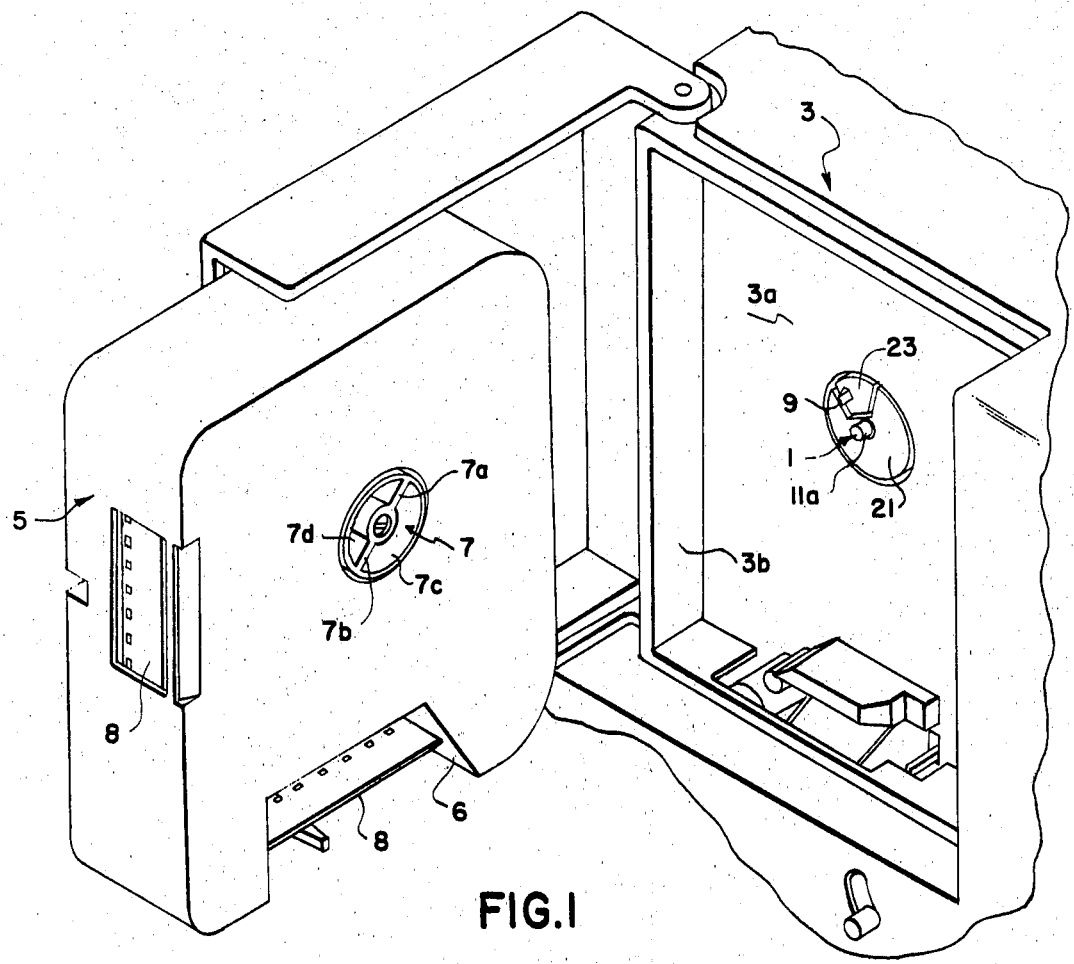
FIG. 1 is a perspective view of a camera incorporating the device of the invention and showing a film cartridge of one type that can be loaded into a camera.

In FIG. 1 of the drawings the anti-backup disabling device generally designated 1 is shown as part of a motion picture camera 3 and is positioned on an inner wall 3a of the camera cartridge chamber 3b. A cartridge 5 is insertable into the camera 3. The camera 3 and cartridge 5 illustrated are adapted to record sound on a sound track on the film while the film is being exposed to scene light by operation of the camera. Reference is made to the commonly assigned U.S. Patent application Ser. No. 248,514 entitled FILM CARTRIDGE, filed Apr. 28, 1972 in the name of Stephen H. Miller now U.S. Pat. No. 3,785,726 issued Jan. 15, 1974 for more details of the camera sound apparatus and the film cartridge. Generally, the portion of cartridge 5 above recess 6 can be similar to the cartridge disclosed in the beforementioned U.S. Pat. application filed in the name of A. J. Tucker. Of course, if sound recording is not desired, the cartridge 5 can be of the type disclosed in the Tucker Patent application or in U.S. Pat. Nos. 3,584,806 and 3,599,894. In order to avoid unnecessary lengthening of this specification and complication of the drawings, and since a description of the portions of cartridge 5 and camera 3 not pertinent to the present invention may be found in the above-cited patent applications, the following description will be directed primarily to the anti-backup disabling device 1 of the present invention.

Referring again to FIG. 1, the cartridge includes a film take-up core 7 having a pair of lugs 7a and 7b. One end of the film 8 is attached to the core so that film is wound onto the core in response to rotation of the core. When the cartridge 5 is fully inserted into the camera 3, one of the two lugs 7a and 7b of the take-up core 7 is engaged by a drive lug 9 projecting from wall 3a of the cartridge chamber adjacent to the disabling device 1. As is well known in the art, during operation of the camera the drive lug 9 is driven through a friction drive to rotate core 7.

Figure 2:
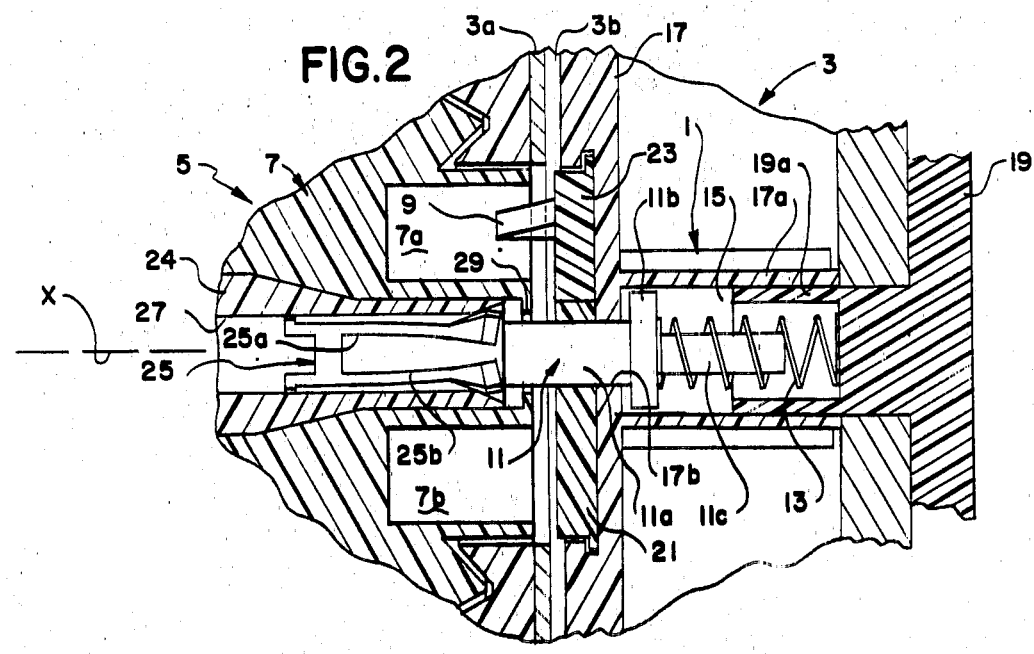
FIG. 2 is an enlarged, fragmentary cross-section view showing the disabling device depressing the anti-backup mechanism to its disengaged position.

FIG. 2 more clearly illustrates the operation of the disabling device 1. The disabling device 1 comprises a pin 11 having a head end portion 11a, an enlarged shoulder portion 11b, and a tail end portion 11c. A spring 13 is coiled around portion 11c and engages shoulder 11b. Portions 11b, and 11c of pin 11 are located in a cavity 15 defined by telescoping at the cylindrical portions 17a and 19a, respectively, of gear 17 and mounting plate 19. The ends of spring 13 react against the gear mounting plate 19 and shoulder 11b to urge the shoulder toward gear 17 and urge portion 11a toward the cartridge. The pin head 11a protrudes through a hole 17b in the gear 17, the hole being coaxial with the axis X of rotation of the gear and being of a diameter which allows only the pin head portion 11a to protrude through gear 17. The remainder of the pin 11 is retained in cavity 15 by virtue of the engagement of the pin shoulder 11b and gear 17. A plate 21 and a plate 23 jointly are substantially cylindrical in shape and are mounted within a complimentary recess in gear 17. The plates are coaxial with gear 17 and frictionally coupled to the gear. Drive lug 9 projects from plate 23 in spaced relation to axis X so that it is driven in a circular path by gear 17.

Referring now to FIGS. 2 and 4, the disengageable anti-backup mechanism for cartridge 5 is the type disclosed in the beforementioned U.S. Pat. application filed Feb. 28, 1972 in the name of A. J. Tucker. The mechanism comprises a control member 25 movable along axis X in a slot 27 in a stationary post 24 around which core 7 rotates. The slot holds member 25 against rotation. Member 25 generally is shaped like a tuning fork and has two flexible arms 25a, and 25b. Post 24 has a plurality of circumferentially spaced ratchet surface 29 that normally are engaged by the end portions of arms 25a and 25b to prevent rotation of the core in the unwinding direction (See FIG. 4). The arms are urged into contact with surfaces 29 by the complimentary-shaped ramp surfaces on the arms and the slot in the post, and the arm can be moved by pin 11 to the FIG. 2 position wherein they are disengaged from surfaces 29, thereby permitting rotation of the core in both directions.

When a sound film cartridge 5 (or other cartridge with a disengageable anti-backup mechanism) is fully inserted in the camera as shown in FIG. 2, the pin head 11a protrudes through openings in the film take-up core 7 and post 24 and head portion 11a engages the arms of the anti-backup device 25. The pin 11, under force exerted by spring 13, forces the anti-backup device 25 to its FIG. 2 position wherein it is clear of ratchet surfaces 29. As noted earlier, the anti-backup device 25 tends to return to its FIG. 4 position against the force exerted by the pin 11, however, the force of the spring 13 is greater than the force exerted by the anti-backup device 25, therefore, the anti-backup device 25 is held clear of the ratchet surfaces 29. For a more detailed description of the structure and operation of the anti-backup device, reference is made to beforementioned copending U.S. Application Ser. No. 229,924, entitled "Disengageable Anti-Backup Device for Film Cartridge," filed Feb. 28, 1972 in the name of A. J. Tucker. The disabling device of the invention also can be used with other disengageable anti-backup devices, such as disclosed in the beforementioned U.S. Pat. Nos. 3,584,806 and 3,599,894. As shown in FIG. 2, when the film cartridge 5 is fully inserted, the drive lug 9 protrudes into one of the recesses 7c or 7d in the core formed by lugs 7a and 7b, and is thereby in position to engage one of the core lugs 7a and 7b to rotate the core 7 in the manner previously described.

FIGS. 3 and 5 illustrate operation of the disabling device of this invention when the camera receives a cartridge which does not have a disengageable anti-backup device and is not provided with an opening to receive the head portion 11a of the pin 11. This type of cartridge is generally designated 31 and comprises a take-up core 32 which rotates about post 24 in the manner previously described for core 7. However, core 32 has a portion 32a that extends across the outer end of post 24 so that head portion 11a of the pin cannot penetrate the core and the post. As illustrated in the drawings, portion 32a of the core is substantially coplanar with the outer surface of the cartridge and its center is aligned with axis X of the disabling device. Cartridge 31 may be constructed in the manner disclosed in the beforementioned U.S. Pat. No. 3,208,686 to Edwards et al.

As cartridge 31 is loaded into the camera the portion 32a of the take-up core engages the outer surface of head portion 11a of the pin and retracts the pin against the force exerted by spring 13, thereby moving the pin to the position illustrated in FIG. 3. While the pin does continue to exert some force onto the take-up core and thereby produce a frictional force that must be overcome by lug 9, the resulting frictional force is relatively small and is minimized by the fact that the pin is coaxial with the axis of rotation on the take-up core. When cartridge 31 is removed from the camera spring 13 returns the pin 11 to its normal or rest position wherein the shoulder 11b abuts against the shoulder defined by gear 17 at the left end of chamber 15.

As will be apparent from the aforegoing description, the disabling device 1 of the invention permits the camera to be loaded with cartridges of the type shown at 5 or 31 and is effective, on the one hand, to disengage automatically the anti-backup device in a cartridge 5 or, on the other hand, to retract to permit normal operation of a cartridge of the type shown at 31. The relatively simple disabling device is automatic in operation and does not require any adjustment or effort on the part of the camera operator. Also, its simplicity and the relatively few parts required for its manufacture enhances its suitability for commercial apparatus since the cost is low and there are few parts that can malfunction. This, of course, assists in producing a highly reliable disabling device which is very desirable in all apparatus, especially those intended for amateurs.

The invention has been described in detail with particular reference to preferred embodiments thereof, but it will be understood that variations and modifications can be effected within the spirit and scope of the invention.

I claim:

1. In a motion picture camera having a cartridge chamber adapted to receive a film cartridge of the type having a disengageable anti-backup mechanism, a device for automatically disabling the anti-backup mechanism of the received cartridge when the cartridge is inserted into the cartridge chamber comprising:
    a. an elongate pin having a head portion engageable with the anti-backup mechanism of the cartridge when the cartridge is inserted into the cartridge chamber, the pin further comprising a shoulder for limiting extension of the head portion into the chamber;
    b. means mounting said elongate pin for movement between (1) a first position wherein said head portion is effective to disable the anti-backup mechanism of the received cartridge and (2) a second position wherein said elongate pin is in a retracted position relative to the cartridge chamber and is thereby ineffective to disable the anti-backup mechanism; and
    c. means for urging said elongate pin toward its first position, said urging means comprising a spring engageable with said pin.

2. In a motion picture camera having a cartridge chamber adapted to receive a film cartridge having a disengageable anti-backup mechanism, a disabling device comprising:
    a. a disengaging member comprising an elongate portion which is engageable with the anti-backup mechanism of a cartridge for automatically disabling the anti-backup mechanism as it is received in said cartridge chamber, said disengaging member further comprising a shoulder portion for limiting extension of the elongate portion into the cartridge chamber;
    b. means mounting said disengaging member for movement between (1) a first position wherein the member is effective to disable the anti-backup mechanism of a received cartridge and (2) a second position wherein said disengaging member is retracted and ineffective to disable the anti-backup mechanism; and
    c. means for resiliently urging said disengaging member toward its first position from its second position.

3. The improvement as set forth in claim 1 wherein the camera has means defining a cavity, said shoulder on said pin being located in said cavity and being movable in said cavity, the pin includes a second end portion opposite from the head portion, and said spring comprises a coil spring positioned around the second end portion and engageable with said shoulder on said pin and with said means defining the cavity in the camera.

4. In a motion picture camera having a chamber adapted to receive a cartridge having a disengageable anti-backup mechanism, the cartridge including a core rotatable about a post, the anti-backup mechanism comprising ratchet teeth on the core and a control member positioned within the post and movable along the post between (1) a first position wherein the control member is engageable with the teeth to prevent rotation of the anti-backup mechanism in one direction, and (2) a second position wherein the control member is disengaged from the teeth thereby permitting rotation of the core in both directions, the post having an opening therein to permit engagement with the control member of the anti-backup mechanism to effect its movement from its first position to its second position, the improvement comprising:
    means in the camera defining an elongate cavity having an opening therein;
    a disabling device for the anti-backup mechanism of a cartridge, said device comprising an elongate pin having a head portion at one end thereof and an enlarged shoulder intermediate the ends thereof, the other end portion of the pin and the shoulder being positioned for movement in said cavity and the head portion thereof projecting through the opening in the cavity and being movable into the cartridge chamber of the camera for engagement with the control member of a cartridge positioned therein; and
    a spring positioned within said cavity and engageable with said pin for urging the pin in a direction to move the head portion thereof against the control member of the anti-backup mechanism of a cartridge for disengaging the control member from the ratchet teeth, said cavity being of sufficient size with respect to said pin to permit retraction of the head portion of the pin relative to the chamber by distance sufficient to allow insertion into the camera cartridge chamber of a cartridge not incorporating a disengageable anti-backup mechanism.

5. A motion picture camera having a chamber adapted to receive a cartridge provided with a disengageable anti-backup mechanism, the cartridge including a core rotatable about a post, the anti-backup mechanism comprising ratchet teeth on the core and a control member positioned within the post and movable along the post between (1) a first position wherein the control member is engageable with the teeth to prevent rotation of the anti-backup mechanism in one direction and (2) a second position wherein the control member is disengaged from the teeth thereby permitting rotation of the core in both directions, the post having an opening therein to permit engagement with the control member of the anti-backup mechanism to effect its movement from its first position to its second position, resilient means for urging said control member toward said first position;

means in the camera defining an elongate cavity having an opening therein;

a disabling device for the anti-backup mechanism of said cartridge, said device comprising an elongate pin having a head portion at one end thereof projecting through the opening in the cavity and being movable into the cartridge chamber of the camera for engagement with the control member of a cartridge received therein; and a spring positioned within said cavity and engageable with said pin for urging the pin in a direction to move said head portion against the control member of the anti-backup mechanism of a cartridge, said spring exerting sufficient force on said pin to overcome said resilient means when said pin is moved into contact with said control member and thereby disengage the control member from the ratchet teeth on the cartridge core.

* * * * *